Feb. 16, 1960   B. JONES   2,925,096
FLOW RESTRICTOR
Filed April 23, 1956

BARTON JONES
INVENTOR.

Huebner, Beehler, Worrel & Herzig.
BY
ATTORNEYS.

United States Patent Office 2,925,096
Patented Feb. 16, 1960

2,925,096

FLOW RESTRICTOR

Barton Jones, San Marino, Calif.

Application April 23, 1956, Serial No. 580,028

7 Claims. (Cl. 137—781)

The invention relates to a dampener for presure differential bellows structures and has particular reference to a mechanism wherein special means is provided to insure against a complete shut-off of communication between the two bellows due to improper damping and at the same time make allowance for any slight lateral shift in the alignment of the shaft.

The need for a dependable measuring device for differences in fluid pressures which has been satisfied by the high caliber performance of differential pressure mechanisms has created new demands for a still further increase in accuracy and dependability of such instruments. That is to say, what for many years has been considered as satisfactory performance for differential pressure mechanisms heretofore in use has been supplanted by more stringent performance requirements. Changes in design brought about by the desire to make a more acceptable and at the same time more economical device, however, find greatest favor when the design is proof against improper adjustment. For example, mechanical tolerances imposed upon the manufacture of instruments of the kind here described may impair to a degree the proper alignment of the shaft which interconnects the valves with bellows movement.

Moreover, in a device of this character it frequently occurs that one or both pressures in the chambers which affect the bellows may fluctuate severely. Hence pressure supplied to one chamber may surge to a degree not acceptable by the measuring means connected to the instrument. Since only average differences in pressure are as a rule sought to be measured, it is desirable to dampen the movements of the bellows and their connecting means so that measuring means actuated by the bellows operation may not be affected by undesired surges.

It is therefore among the objects of the invention to provide a new and improved dampening system for a differential pressure instrument which can be rapidly and readily adjusted to achieve a proper dampening effect.

Another object of the invention is to provide a new and improved pressure differential mechanism wherein the dampening effect is achieved by employment of an adjustable by-pass for liquid with which the bellows are filled and wherein a relief is provided circumventing the by-pass in the event if for any reason the by-pass dampening adjustment may not be properly made.

Still another object of the invention is to provide a new and improved differential presure bellows mechanism which is so designed and constructed as to be proof against improper dampening even though a shift in the alignment of the valve shaft might be necessary where such a shift might otherwise impair the smoothness of operation and the accuracy of the device throughout expected periods of use.

A further object of the invention is to provide a new and improved differential pressure type bellows mechanism incorporating a throttle or damper effective upon the passage of the incompressible liquid from one bellows to another wherein the full effect of the throttle may be realized at all times without the hazard of the throttle becoming blocked, thereby to incur damage to the instrument such as would result if flow of liquid from one side to the other were inadvertently stopped.

A further object still of the invention is to provide a new and improved differential pressure bellows mechanism which incorporates a shaft restrictor around the shaft which remains fully effective at all times even though the axial center of the restrictor and shaft passing therethrough be shifted from one side to another, the restrictor being so constructed that likelihood of the action becoming blocked is eliminated.

Still further among the objects of the invention is to provide a new and improved differential pressure instrument wherein a restriction is provided around a shaft which may interconnect movable ends of the bellows, the restriction being in effect a releasable restriction operable under extreme conditions of differential pressure to the end that damage to the instrument is prevented by action of the restriction under those extraordinary conditions.

With these and other objects in view, the invention consists in the construction, arrangement and combination of the various parts of the device whereby the objects contemplated are attained, as hereinafter set forth, pointed out in the appended claims and illustrated in the accompanying drawings.

Figure 1:
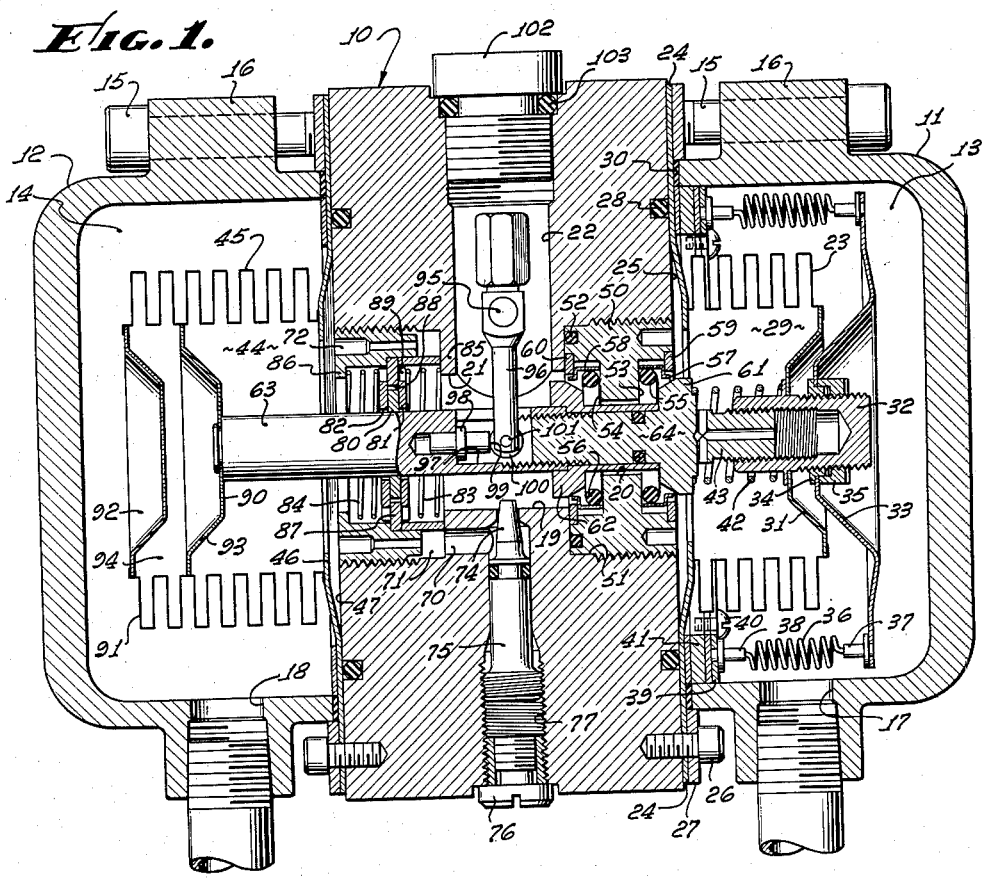
Figure 1 is a longitudinal sectional view of a differential pressure mechanism showing the restrictor and dampening means on the shaft in operating position.
Figure 2:
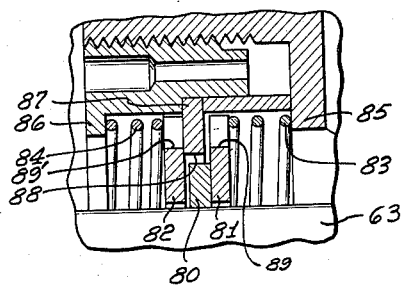
Figure 2 is a fragmentary longitudinal sectional view of the restrictor on the shaft in a position occupied under extraordinary conditions wherein the usual dampening means might not be properly effective.

In an embodiment chosen for the purpose of illustration a differential pressure bellows type unit is shown encompassed within a housing assembly constituting several main parts including a partition indicated generally by the reference character 10 and oppositely facing housings 11 and 12. The housing 11 provides a chamber 13 and a chamber 14 is provided by the housing 12. Bolts 15 received in flanges 16 have a threaded engagement with the partition for holding the housings in place. A pressure port 17 supplies the chamber 13 and a similar pressure port 18 supplies the chamber 14.

The partition 10 is of special construction in that it is built to provide a somewhat composite passageway comprising a central passage 19, a valve passage 20 and a sealed passage 21, all of the passages being of appreciable length. Extending laterally from the central passage is a recess 22. The composite passage referred to and the recess as well communicates respectively with spaces on opposites sides of the partition.

In the chosen embodiment a flexible expansion unit in the chamber 13 has the form of a bellows 23. A flange 24 of the bellows is secured to a face 25 of the partition by employment of cap screws 26 and a ring 27 as described in greater detail in co-pending application Serial No. 577,991, filed April 13, 1956. A seal 28 assures a chamber 29 within the bellows 23 against any ingress or egress at the line of junction of the bellows with the partition. A seal 30 may be employed beneath the edge of the housing 11 where it is pressed into position against the flange 24. The bellows 23 is provided with a closed end 31 movable when the device is in operation and to which is attached a sleeve 32. A spider 33 is secured by appropriate nuts 34 and 35 to the sleeve so as to be movable in response to movement of the closed end 31. Tension springs 36 are secured by appropriate means 37 to the outer ends of the spider and by similar means 38 to a ring 39. The ring 39 is attached in turn by screws 40 to a flange 41 which is in turn fastened upon the flange 24.

A central compression spring 42 within the chamber 29 serves normally to exert pressure on the threaded connection between the sleeve 32 and a valve stem 43 to prevent disconnection.

Attached to the sleeve 32 is a shaft or valve stem 43 which in its composite form extends through the passages 20, 19 and 21 into a chamber 44 within a bellows 45. It will be noted that the bellows 45 lies within the chamber 14 and is provided with a flange 46 anchored to a face 47 of the partition in the same manner as was described in connection with the bellows 23.

A bushing 50 threadedly engages an enlarged pocket 51 in which it is sealed by employment of an O-ring seal 52 received in a suitable recess. The bushing carries valve seat holders 53 and 54 on opposite sides of a central annular flange, the holders being equipped respectively with O-ring seals 55 and 56. Guides 57 and 58 assist in the positioning and retention of the O-rings, the guides being held by washers 59 and 60.

The shaft or axle 43 has a valve section on which are mounted valve elements 61 and 62 cooperable respectively with valve seats 53 and 54 and the O-ring seals thereon. More properly a valve shaft extension 63 is threadedly secured to a valve carrying section 64 to form a composite shaft.

In order to appropriately throttle flow of liquid from one bellows chamber to another there is provided a by-pass passage 70 fed from an annular passage 71 into which secondary by-pass passages 72 converge. A throttle valve 74 manipulated by means of a valve stem 75 can be threaded in and out so as to control the rate of flow between the by-pass passage 70 and the central passage 19. A sealing cap 76 is adapted to close a recess 77 in which the valve stem 75 is located.

So that it may not be possible to cause damage to the mechanism in the event of a surge in pressure should the throttle valve 74 be completely closed for any reason, means is provided to relieve against such positive shut off. The means enjoys a dual purpose and is embodied in a floating restrictor in the sealed passages 21.

The floating restrictor comprises a restrictor ring 80 having a snug sliding fit on the exterior of the valve shaft extension 63. To hold the restrictor ring in place keeper rings 81 and 82 are provided. These rings are pressed into position respectively by coiled springs 83 and 84 anchored at outer ends by spring-keeping flanges 85 and 86. A stationary ring 87 has a hole 88 therethrough which exceeds in circumference the outside circumference of the restrictor ring 80 by an amount sufficient to permit any expected adjustment in the alignment of the valve shaft or stem 43. Circumferential openings 89 in the keeper ring 81 allow the passage of liquid in certain relieved positions of the ring 81. Similarly openings 89' in the keeper ring 82 will allow liquid to pass the exterior of the restrictor ring 80 when relief action of the seal so provides.

The shaft extension 63 is secured in a movable end 90 of the bellow 45. An incident in the construction of this bellows is the provision of a temperature compensating bellows 91 having a movable end 92 capable of compensating for temperature differences which might occur. It will be noted that a hole 93 provides for communication between a chamber 94 in the auxiliary bellows and the chamber 44 within the bellows 45.

Inasmuch as it is the longitudinally reciprocating movement of the shaft or valve stem identified in general by the reference character 43 which must be carried to some measuring device exterior to the instrument, means is incorporated to carry that movement. The means consists in general of an axle 95 having a rotatably sealed position within the partition and extending into the recess 22. An arm 96 is non-rotatably attached to the axle and is adapted to rotate the axle as the arm pivots. The shaft 43 and more particularly the shaft extension 63 is provided with an opening 97 within which a bearing shoe 98 is centerably disposed. The bearing shoe presents a face 99 upon which a roller 100 is adapted to roll. The roller is rotatably mounted upon a pin 101 at the free end of the arm 96, the arm 96 being spring loaded in a conventional fashion (not shown) so that the roller 100 is urged against the face 99. The surface of the face 99 is sufficiently great to permit the shoe to be shifted to a degree in an axial direction as the shaft 43 might shift without in any way impairing a proper bearing of the face 99 upon the roller 100.

A cap 102 beneath which is a seal 103 is adapted to seal the recess 22 so that all of the interior of the mechanism is sealed against atmosphere.

When a device of the type herein described is placed in operation the chambers 29 and 44 within the respective bellows 23 and 45 together with the interconnected passages 19, 20 and 21, as well as the recess 22, are filled with an incompressible liquid. During the filling all air or gas of any kind is excluded. The flanges 24 and 46 of the respective bellows 23 and 45 are positively sealed upon the appropriate faces of the partition.

After the housings 11 and 12 have been mounted in place the chambers 13 and 14 within the respective housings may be subjected to gas under pressure. In general the differential pressure type bellows operates in a well-known manner whereby when the pressure in one of the chambers 13 or 14 is different from the other, the corresponding bellows is depressed, thereby forcing liquid to flow between the bellows chamber 29 and the bellows chamber 44 in a direction corresponding to the action of bellows under greater pressure. Should the pressure on either side reach too great an amount, one or the other of the valve elements 61 or 62 will seat, thus preventing any further collapse of the bellows on the high pressure side and expansion of the bellows on the low pressure side and preserve the mechanism from damage.

Under many circumstances it is highly advisable to throttle the flow of incompressible liquid from one bellows chamber to another. To that end the throttle valve 74 is provided. When it is appreciated, however, that the throttle valve might inadvertently be screwed tight shut, flow of liquid between the bellows would be shut off with the valve elements unseated as well as seated. Should a surge of unbalanced pressure occur at such a time, one or another of the bellows would be subject to damage. To avoid a complete shut off of flow of the incompressible liquid the springs 83 and 84 are made with tension light enough that liquid pressing against one side or another of the restrictor ring 80 will force the restrictor ring against the keeper ring opposing the flow and away from the opposite keeper ring. Liquid is consequently permitted to flow between the appropriate keeper ring and the upstream restrictor ring into the space around the exterior of the restrictor ring and thence through one or another of the openings 89 or 89' around the exterior of the downstream keeper ring.

Therefore, except for the resistance of the appropriate spring 83 or 84, as the case may be, flow of liquid through the sealed passage 21 is made possible. This control remains equally effective even though in the assembly of the device the shaft or valve stem 43 might have to be shifted axially. Should such an adjustment occur, the restrictor ring 80 will follow the shaft but will remain confined between the respective keeper rings 81 and 82.

Similarly in the event of such a shifting of the position of the shaft or valve stem 43, the shoe 98 will also shift but some portion of the face 99 will remain beneath the roller 100 and streamlined motion of the shaft will continue unimpaired and be transferred to the arm 96 consistently by operation of the roller 100. Positive operation therefore of the moving parts of the device is assured without change in the friction characteristics of the mechanism even though it may be necessary to shift the position of the shaft 43 during assembly or perhaps during servicing. By reason of the structure thus shown and defined, greater dependability is built into the mechanism and especially the moving parts, thereby assuring longer life and at the same time minimizing the operations attendant upon manufacture and assembly of the device.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. In a differential pressure responsive device a housing assembly comprising a partition having a passage therethrough, a housing member secured on one side of the partition forming a chamber and a pressure responsive unit in said chamber sealed upon the partition, a shaft secured to the pressure responsive unit and extending through said passage, a floating restrictor in the passage between the shaft and a surrounding wall of the passage comprising a restrictor ring having a sliding fit around the shaft, a keeper ring located on one side of the restrictor ring and means forming a pasage between opposite sides of the keeper ring, and resilient means between said keeper ring and the partition biased to hold said keeper ring against the restrictor ring.

2. In a differential pressure responsive device a housing assembly comprising a partition having a passage therethrough, a housing member secured on one side of the partition forming a chamber and a pressure responsive unit in said chamber having an edge thereof sealed upon the partition, a shaft secured to the pressure responsive unit and extending through said passage, oppositely facing annular valve seats in said passage circumscribing said shaft and valve elements for said seats on said shaft, a floating restrictor in the passage between the shaft and a surrounding wall of the passage comprising a restrictor ring having a sliding fit around the shaft, a keeper ring located on one side of the restrictor ring and means forming a passage between opposite sides of the keeper ring, and a spring between said keeper ring and the partition biased to hold said keeper ring against the restrictor ring.

3. In a differential pressure responsive device a housing assembly comprising a partition having a passage therethrough, a housing member secured on one side of the partition forming a chamber and a flexible expansible unit in said chamber having an edge thereof sealed upon the partition, a shaft secured to the flexible expansible unit and extending through said passage, oppositely facing annular valve seats in said passage circumscribing said shaft and valve elements for said seats on said shaft, a floating restrictor in the passage between the shaft and a surrounding wall of the passage comprising a restrictor ring having a sliding fit around the shaft, keeper rings located on opposite sides of the retrictor ring and means forming a passage between opposite sides of the respective keeper rings, and springs between said keeper rings and the partition biased to hold said keeper rings against the restrictor ring, means forming a by-pass passage through said partition around said floating seal, and an adjustable throttle in said by-pass passage.

4. In a differential pressure responsive device a housing assembly comprising a partition having a passage therethrough, a housing member secured on one side of the partition forming a chamber and a flexible expansible unit in said chamber having an edge thereof sealed upon the partition, a shaft secured to the flexible expansible unit and extending through said passage, oppositely facing annular valve seats in said passage circumscribing said shaft and valve elements for said seats on said shaft, a floating restrictor in the passage between the shaft and a surrounding wall of the passage comprising a restrictor ring having a sliding fit around the shaft, a keeper ring located on one side of the restrictor ring and means forming a passage between opposite sides of the keeper ring, and a spring between said keeper ring and the partition biased to hold said keeper ring against the restrictor ring, means forming a by-pass passage through said partition around said floating restrictor, and an adjustable throttle in said by-pass passage.

5. In a differential pressure unit a housing assembly comprising a partition having a passage therethrough, a housing secured on each side of the partition forming a chamber and a flexible expansible unit in each chamber having an edge thereof sealed upon the partition, a shaft secured to a movable portion of at least one of said units and extending through said passage, oppositely facing annular valve seats on said partition circumscribing said shaft and valve elements for said seats on said shaft, a floating restrictor in the passage between the shaft and a surrounding wall of the passage comprising a restrictor ring having a sliding fit around the shaft, a pair of keeper rings located respectively adjacent opposite faces of the restrictor ring and means forming a passage between opposite faces of the keeper rings, a spring between each keeper ring and the partition biased to hold said keeper ring against the restrictor ring, means forming a by-pass passage through said partition around said floating restrictor, and an adjustable throttle in said by-pass passage.

6. In a differential pressure unit a housing assembly comprising a partition having a passage therethrough, a housing secured on each side of the partition forming a chamber and a flexible expansible unit in each chamber having the edge thereof sealed upon the partition, a shaft secured to the center of at least one of said units and extending through said passage, oppositely facing annular valve seats on said partition circumscribing said shaft and valve elements for said seats on said shaft, a floating restrictor in the passage between the shaft and a surrounding wall of the passage comprising a restrictor ring having a sliding fit around the shaft, a stationary ring in the passage surrounding the periphery of the restrictor ring with a clearance therearound, a pair of keeper rings located respectively on opposite sides of the restrictor ring and stationary ring and means forming a passage between opposite faces of the keeper rings, a spring between each keeper ring and the partition biased to hold said keeper rings against the restrictor ring, and means forming a by-pass passage through said partition around said floating restrictor.

7. In a differential pressure bellows unit a housing assembly comprising a partition having a passage therethrough and a laterally extending opening communicating with the passage, a housing secured on each side of the partition forming a chamber and a flexible expansible unit in each chamber having an edge thereof sealed upon the partition, a shaft secured at opposite ends to the center of a movable portion of each respective unit and extending through said passage, oppositely facing annular valve seats on said partition circumscribing said shaft and valve elements for said seats on said shaft, a floating restrictor in the passage at one side of said valve seats between the shaft and a surrounding wall of the passage comprising a restrictor ring having a sliding fit around the shaft, a stationary ring in the passage surrounding the restrictor ring with a peripheral clearance normally on all sides, a pair of keeper rings located respectively adjacent opposite faces of the restrictor ring and stationary ring, and means forming a passage through each clearance ring, a spring between each keeper ring and the partition biased to hold each said keeper ring against the restrictor ring, means forming a by-pass passage through said partition around said floating restrictor, and a manually adjustable throttle in said opening and extending into said by-pass passage.

References Cited in the file of this patent

UNITED STATES PATENTS

| | | |
|---|---|---|
| 2,171,168 | Swank | Aug. 29, 1939 |
| 2,412,533 | Petrie | Dec. 10, 1946 |
| 2,632,474 | Jones | Mar. 24, 1953 |
| 2,762,392 | Reese | Sept. 11, 1956 |
| 2,762,393 | Reese | Sept. 11, 1956 |